GALE & AMES.
Carriage Seat.

No. 92,036.

Patented June 29, 1869.

Witnesses.

INVENTORS

United States Patent Office.

JOHN GALE AND MOSES B. AMES, OF LAWRENCE, MASSACHUSETTS.

Letters Patent No. 92,036, dated June 29, 1869.

IMPROVEMENT IN CARRIAGE-SEATS.

The Schedule referred to in these Letters Patent and making part of the same.

*To all whom it may concern:*

Be it known that we, JOHN GALE and MOSES B. AMES, of Lawrence, in the county of Essex, and State of Massachusetts, have invented a new and improved Method of Constructing and Operating Jump-Seats of Carriages; and we do hereby declare that the following is a full, clear, and exact description thereof, reference being had to the accompanying drawings, and to the letters of reference marked thereon.

The nature of our invention consists in connecting the rear seat to the body, in such a manner that when the front seat is not desired for use, it is dropped into the bottom of the body, and the rear seat is jumped forward into its place, and the rear part of the body is still covered over, or separated from the front portion, by a partition running on an angle from the rear of the seat to the bottom of the body.

The object of our invention is to prevent rain, wind, and dust or dirt from entering the rear of the body, and running forward to the feet of the occupants, and thereby wetting the same, or otherwise soiling the lower portion of their garments. Also, preventing the wind from blowing in at the rear end of the body against the feet and limbs of the occupants. Also, preventing the same from being exposed to view from the rear of the seat, when used as a single-seated carriage.

We accomplish these, and other desirable objects, by constructing the rear part of the body covered over by a panel, or otherwise; or, if desired, we construct a partition extending from the lower portion of the seat to the bottom of the body. We then construct the rear arms, that connect the seat with the body, with a short bend, forming an elbow, so as to allow them to pass around or over the edge of the partition or covering, as the case may be. This arrangement and construction of the arms permit the rear portion of the body to be covered over, or be separated from the front portion by a partition, as above set forth.

To enable others to make and use our invention, we will proceed to describe its construction and operation.

A represents the body of the carriage.

B represents the seat.

C represents the arms having the elbow.

E represents the short front straight arms.

*t* represents uprights, to which the lower ends of the front arms are attached by a screw-bolt, forming a pivot upon which they turn.

*s* represents uprights or stay-pieces, fastened to the sides of the body upon an angle. To these are attached the lower ends of the bent arms by bolts, also forming pivots for them to turn upon.

D represents the lower portion of the seat, to which the upper ends of all the arms are attached, in the same way that the lower is attached to the body.

Figure 1:
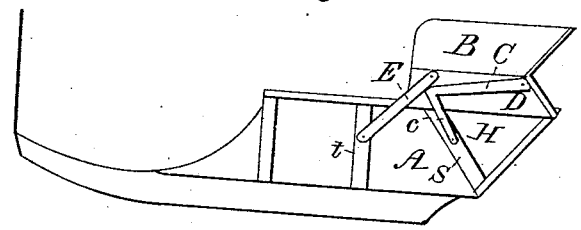
Figure 1 is a transverse section of a carriage-body and seat, showing our invention as with a partition, and the seat jumped back over the rear of the body, the red line representing the partition.
Figure 2:
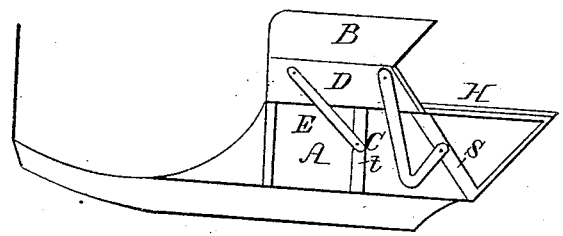
Figure 2 is a similar view, with the seat jumped forward, the red line representing the panel or covering closing the rear of the body.

In fig. 1, the red line H represents the partition, while in fig. 2, the red line H represents the panel or covering, each serving the same purposes, as set forth and described above, both being used in constructing single-seated carriages.

We make no claim to them separately.

Having thus described our invention,

What we claim, and desire to secure by Letters Patent, is—

In combination with the body and jump, or shifting rear seat of a carriage, the bent arms C, partition or covering H, when combined and arranged substantially in the manner as and for the purposes set forth.

JOHN GALE.
MOSES B. AMES.

Witnesses:
JOHN H. GILMAN,
CHARLES STEVENS.